2,773,897

PREPARATION OF METHYLSUCCINIC ACID AND METAL SALTS THEREOF

Abraham Bavley, Brooklyn, and Charles J. Knuth, Forest Hills, N. Y., assignors to Chas. Pfizer & Co., Inc., Brooklyn, N. Y., a corporation of Delaware No Drawing. Application June 7, 1952, Serial No. 292,384

4 Claims. (Cl. 260—537)

This invention relates to an improved process for preparing methylsuccinic acid and metal salts thereof, and more particularly, to an improved process for catalytically hydrogenating itaconic acid to methylsuccinic acid, also known as pyrotartaric acid.

It is known that itaconic acid can be converted to methylsuccinic acid by hydrogenation in the presence of a hydrogenation catalyst. However, the catalysts heretofore employed for this purpose, such as colloidal platinum or platinum black, are in general expensive, necessitating great care in handling to avoid costly losses, or require relatively high ratios of catalyst to reactant, which also increases the cost of employing them.

It has now been found that methylsuccinic acid can be prepared in excellent yields by hydrogenation of itaconic acid under superatmospheric pressure and at an elevated temperature in the presence of a Raney nickel catalyst, provided that the reaction is conducted in an alkaline solution. The itaconic acid may be obtained by methods well known in the art, such as by fermentation of carbohydrates, treatment of citric acid, and the like.

The hydrogenation is preferably carried out in aqueous solution. Before hydrogenation, the itaconic acid is neutralized with an alkaline material, such as an alkali metal hydroxide, preferably sodium hydroxide, to form the corresponding metal itaconate. Other alkali metal hydroxides, such as potassium and lithium hydroxides, are also suitable, as are the alkali metal carbonates. In general, a sufficient amount of the alkaline material is employed to completely neutralize both carboxyl groups of the itaconic acid, a stoichiometric equivalent being preferred, although an excess can be employed. Any free carboxylic acid tends to poison the catalyst and lower the yield of methylsuccinic acid. In addition, the alkali metal salts are generally much more soluble in water than the acid, and thus permit the reaction to be conducted at greater concentrations.

After the itaconic acid has been neutralized with alkaline material and dissolved, the nickel catalyst is added to the solution in preparation for the hydrogenation. The catalyst which has been found to be particularly effective for the reaction is that known as Raney nickel, which is readily available on the open market or may be prepared by treating an alloy of aluminum and nickel in finely divided form with an alkali to dissolve out the aluminum, leaving the nickel in a porous and highly active state. Although relatively large ratios of catalyst to the itaconic acid can be employed, it has been found that excellent yields can be obtained with as little catalyst as 1 to 6 percent by weight of the itaconic acid.

The hydrogenation is carried out within the temperature range of about 45 to 200° C., preferably between 50° and 150° C. Below 45° C. the reaction proceeds at an impracticably slow rate, and above 200° C. side reactions occur which lower the yield of methylsuccinic acid to a generally undesirable level. In fact, even at temperatures as low as 160° C., a reduction in hydrogen uptake, and the formation of a waxy material in the product, have been observed. However, a substantial yield of methylsuccinic acid is nevertheless obtained at the temperatures indicated, as evidenced by a 65 molar percent hydrogen uptake at 200° C., a 75 percent uptake at 160° C. and 92 percent uptake at 60° C. in a hydrogenation which was initiated under pressure of about 2000 pounds of hydrogen per square inch.

It is preferred to employ a pressure in the order of about 50 to 2000 pounds of hydrogen per square inch. The time of reaction may vary considerably, depending upon the reaction conditions and other factors, but in general, from about ½ to 5 hours is sufficient to obtain a substantial yield of methylsuccinic acid. For optimum yields, the reaction is terminated when approximately 1 mol of hydrogen has been reacted per mol of itaconic acid. Care should be taken to avoid extreme conditions in view of the undesirable side reactions which may result therefrom.

Upon completion of the hydrogenation, the catalyst is filtered off, and the filtrate is acidified with a suitable acid, such as hydrochloric acid, sulfuric acid, and the like, to release the methylsuccinic acid from its metal salt, which is present after hydrogenation. The methylsuccinic acid is then separated from the metal salt so produced, by drying, solvent extraction and recrystallization. Suitable solvents for this purpose include acetone and diethyl ether. Alternatively, the methylsuccinic acid can be extracted into water-immiscible solvents by appropriate treatment of the acidified solution. The di-metal salt of methylsuccinic acid can also be separated from the filtrate without acidification by known methods, if the metal salt is desired rather than the acid. Furthermore, the mono- and di-alkyl esters of methylsuccinic acid are conveniently prepared by drying the acidified filtrate and esterifying the dried product with an appropriate alkanol, preferably in the presence of additional acid, such as hydrochloric or sulfuric acid, to catalyze the esterification.

The invention is further illustrated by the following examples:

Example I

Five hundred and sixty-four gms. of itaconic acid were dispersed in 780 ml. water and neutralized with 351 gms. sodium hydroxide. The resulting aqueous solution of sodium itaconate was then hydrogenated with the addition of 2.3 percent by weight of Raney nickel. The reaction mixture was heated in a hydrogenation bomb under 1800 pounds per square inch hydrogen pressure, and the pressure began dropping as soon as the temperature reached 50° C., indicating that hydrogen was being taken up. The pressure was occasionally raised back to 1800 pounds per square inch until the reaction was terminated. The temperature was maintained at 50–90° C. during the course of the run, which totaled 4 hours.

When the pressure curve leveled off with time and the calculated hydrogen uptake reached 1 mol of hydrogen per mol of sodium itaconate, the reaction was terminated. The catalyst was filtered off and the filtrate adjusted to pH2 with hydrochloric acid and taken to dryness. The product was separated from the sodium chloride by solvent extraction with ether and the extract was evaporated to dryness and recrystallized from acetone.

Repeated concentration of the mother liquors gave a total of 504 gms. of methylsuccinic acid, representing 88 percent of the theoretical yield. The methylsuccinic acid thus obtained was a white crystalline material melting at 110–110.5° C.

Example II

Sixty-five gms. of itaconic acid were dispersed in 130 ml. of water, neutralized with 40 gms. of sodium hydroxide, and then 6.6% by weight of Raney nickel were added to the solution. The mixture was placed in a hydrogenation bomb and heated to 80° C. under a pressure of 2,000 pounds per square inch of hydrogen. The reaction was allowed to proceed to completion and the theoretical volume of hydrogen was taken up. After cooling, the reaction mixture was filtered to separate the catalyst, and the filtrate was acidified with hydrochloric acid to pH2 and evaporated to dryness. Thereafter, 150 ml. of ethanol were added and the mixture was warmed to 85° C., then allowed to cool to room temperature, after which the sodium chloride was filtered off. The cake was reslurried with 100 ml. of ethanol and refiltered. The filtrates were combined and stripped of ethanol. When all the ethanol had been removed, there remained an almost colorless oil having a fruit-like odor and a refractive index of 1.4305 at 26° C. It was found to be the monoethyl ester of methylsuccinic acid, which is readily converted to the di-ester by further esterification with alcohol in the presence of hydrochloric or sulfuric acid.

Thus, this invention provides an economical and efficient process for preparing methylsuccinic acid and its metal salts without the disadvantages which attend prior art methods. The products so obtained are useful as intermediates in organic syntheses, particularly in the preparation of alkyd resins and esters for plasticizing purposes.

Resort may be had to such modifications and equivalents as fall within the spirit of the invention and the scope of the appended claims.

We claim:

1. A process which comprises catalytically hydrogenating an alkali metal itaconate in the presence of a Raney nickel catalyst at a temperature from about 45° to 200° C. and under superatmospheric hydrogen pressure.

2. A process which comprises catalytically hydrogenating an aqueous solution of an alkali metal itaconate in the presence of a Raney nickel catalyst at a temperature from about 45° to 200° C. and under a hydrogen pressure from about 50 to 2000 pounds per square inch.

3. A process which comprises neutralizing an aqueous solution of itaconic acid with an alkali metal hydroxide to form an alkali metal itaconate, contacting the neutralized solution with hydrogen in the presence of a Raney nickel catalyst at a temperature from about 45° to 200° C. under superatmospheric pressure, and terminating the reaction when approximately one mol of hydrogen has been reacted per mol of said alkali metal itaconate.

4. A process for preparing methylsuccinic acid which comprises catalytically hydrogenating an aqueous solution of sodium itaconate in the presence of a Raney nickel catalyst at a temperature from about 50° to 150° C. and under a hydrogen pressure from about 50 to 2000 pounds per square inch, terminating the reaction when approximately one mol of hydrogen has been reacted per mol of said sodium itaconate, acidifying the sodium itaconate thus hydrogenated, and recovering methylsuccinic acid from the acidified product.

References Cited in the file of this patent

UNITED STATES PATENTS

| | | |
|---|---|---|
| 2,194,362 | Macallum | Mar. 19, 1940 |
| 2,334,140 | Winans | Nov. 9, 1943 |

FOREIGN PATENTS

| | | |
|---|---|---|
| 885,395 | France | May 24, 1943 |

OTHER REFERENCES

Lebedev et al.: J. Chem. Soc., vol. 127, p. 419–421, 430–433 (1925).

Platanov et al.: Chem. Abst., vol. 26, p. 16 (1932).

Houben: Die Methoden der Org. Chem., vol. 2, p. 322–325 (1943).

Dixon et al.: Chemical Soc. Journal, 1949, p. 2142.